US012270945B2

(12) United States Patent
Kimura et al.

(10) Patent No.: US 12,270,945 B2
(45) Date of Patent: Apr. 8, 2025

(54) OPTICAL RANGING DEVICE, LASER LIGHT EMITTING DEVICE, AND METHOD FOR MANUFACTURING THE SAME

(71) Applicant: DENSO CORPORATION, Kariya (JP)

(72) Inventors: Teiyu Kimura, Kariya (JP); Kenichi Yanai, Kariya (JP); Shinji Kashiwada, Kariya (JP); Yoshihide Tachino, Kariya (JP)

(73) Assignee: DENSO CORPORATION, Kariya (JP)

( * ) Notice: Subject to any disclaimer, the term of this patent is extended or adjusted under 35 U.S.C. 154(b) by 973 days.

(21) Appl. No.: 17/344,417

(22) Filed: Jun. 10, 2021

(65) Prior Publication Data

US 2021/0341587 A1 Nov. 4, 2021

Related U.S. Application Data

(63) Continuation of application No. PCT/JP2019/047775, filed on Dec. 6, 2019.

(30) Foreign Application Priority Data

Dec. 14, 2018 (JP) .................................. 2018-234447
Nov. 12, 2019 (JP) .................................. 2019-204360

(51) Int. Cl.
*G01S 7/481* (2006.01)
*G01S 7/484* (2006.01)

(52) U.S. Cl.
CPC ............ *G01S 7/4817* (2013.01); *G01S 7/484* (2013.01)

(58) Field of Classification Search
CPC ...... G01S 7/4817; G01S 7/484; G01S 7/4863; G01S 7/4865; G01S 17/10; G01S 17/42
USPC ........................................................ 356/5.01
See application file for complete search history.

(56) References Cited

U.S. PATENT DOCUMENTS

| 5,802,088 | A | 9/1998 | Otsuka et al. |
| 2016/0274223 | A1 | 9/2016 | Imai |
| 2018/0284236 | A1 | 10/2018 | Schwarz et al. |

FOREIGN PATENT DOCUMENTS

| JP | H11-017270 A | 1/1999 |
| JP | 2018-059898 A | 4/2018 |
| WO | 2017/112416 A1 | 6/2017 |

*Primary Examiner* — Daniel L Murphy
(74) *Attorney, Agent, or Firm* — Maschoff Brennan

(57) ABSTRACT

An optical ranging device includes a light emitting section provided with a semiconductor laser element having a light emitting region whose length in a first direction is more than that in a second direction intersecting the first direction. The device measures the distance to an object based on the time from light emission from the light emitting section to reception of the light by a light receiving section. A plurality of light emitting regions may be provided in the light emitting section such that they are separated in the second direction and abut or partially overlap each other in the first direction so that the light emitting regions are continuous in the first direction.

10 Claims, 12 Drawing Sheets

OPTICAL RANGING DEVICE, LASER LIGHT EMITTING DEVICE, AND METHOD FOR MANUFACTURING THE SAME

CROSS-REFERENCE TO RELATED APPLICATION

The present application is based on and claims the benefit of priority from earlier Japanese Patent Applications No. 2018-234447 filed Dec. 14, 2018 and No. 2019-204360 filed Nov. 12, 2019, the descriptions of which are incorporated herein by reference.

BACKGROUND

Technical Field

The present disclosure relates to a technique for optically measuring a distance to an object.

Related Art

A ranging technique is known in which a laser beam is projected onto a certain region to measure a distance to a target object based on the time it takes to detect the reflected light.

SUMMARY

As an aspect of the present disclosure, an optical ranging device that uses laser light is provided. The optical ranging device includes: a light emitting section provided with a semiconductor laser element including a light emitting region having a configuration in which a length thereof in a first direction is more than that in a second direction intersecting the first direction; a light receiving section that detects reflected light of the laser light emitted from the light emitting section; and a measuring section that measures a distance to an object based on a time from emission of the light from the light emitting section to reception of the light by the light receiving section. The light emitting section includes a plurality of light emitting regions that are separated from each other in the second direction and abut or partially overlap each other in the first direction. The light receiving section includes a plurality of light receiving elements in a direction corresponding to the first direction. A width of a light receiving region in a direction corresponding to the second direction of the light receiving elements is equal to or more than a length corresponding to a gap distance of the light emitting regions in the second direction.

DETAILED DESCRIPTION OF THE PREFERRED EMBODIMENTS

As described in JP 2016-176721 A, a ranging technique is known in which a laser beam is projected onto a certain region to measure a distance to a target object based on the time it takes to detect the reflected light. In such a ranging technique, there have been attempts to scan a certain region two-dimensionally with a laser beam to measure a distance to a target object in the region using a plurality of laser light sources arranged in the sub-scanning direction of the laser beam intersecting the main-scanning direction thereof, so that performing main scanning once would provide detection for the target object over a region in the sub-scanning direction.

However, when a plurality of light sources (light emitting surfaces) of a semiconductor laser element are arranged in the sub-scanning direction, it is extremely difficult to arrange them without creating a gap between adjacent light emitting surfaces (light sources) of the laser element. Therefore, there may be a gap between an area covered by one light emitting surface of the laser element and another area covered by an adjacent light emitting surface. It is considered that these gaps between the areas covered by laser beams may cause problems in detecting objects that exist in the gaps, or produce a considerable delay in detection even if such objects are detected.

A. First Embodiment

Figure 1:
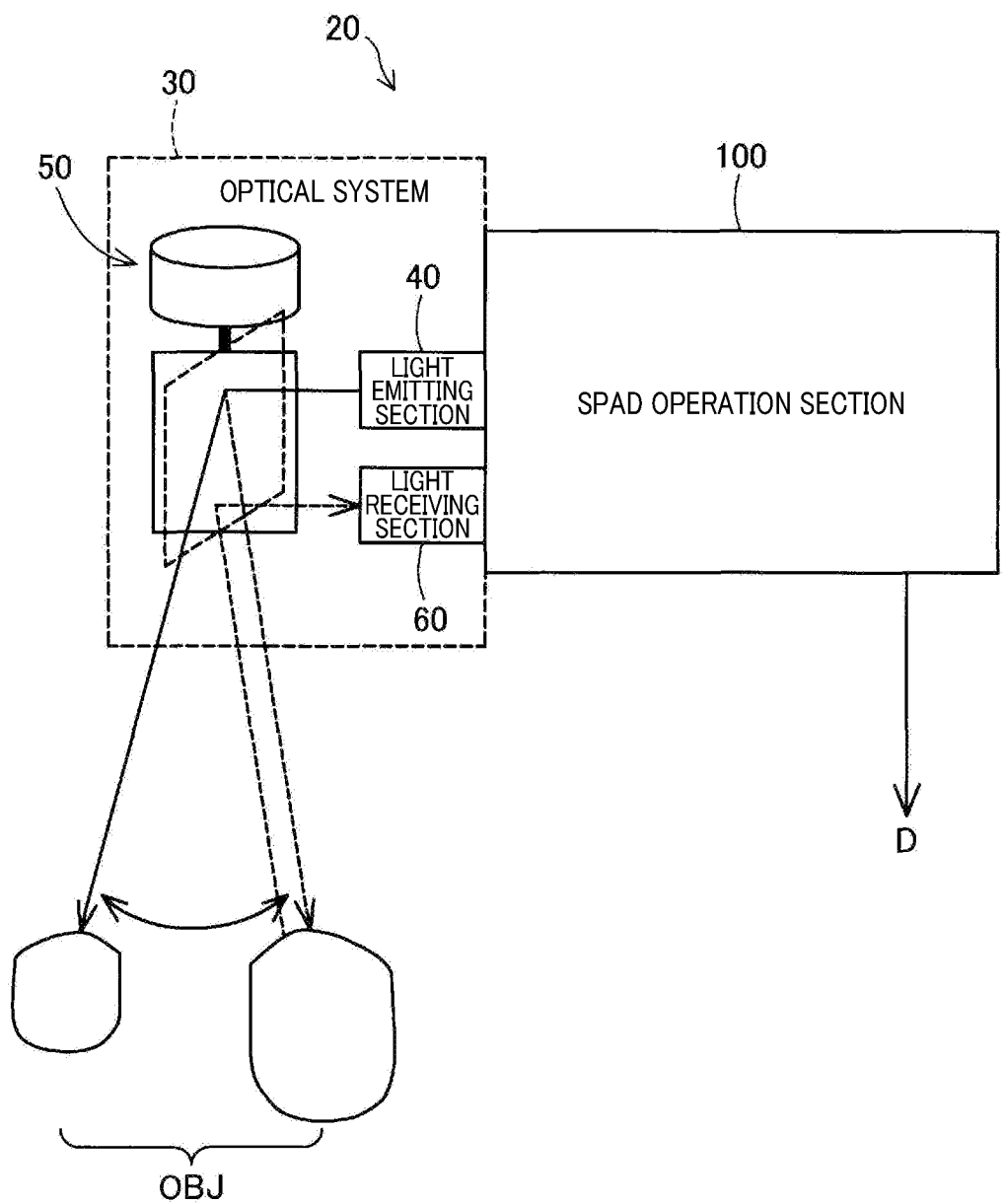
FIG. 1 is a schematic configuration diagram of an optical ranging device according to an example.

An optical ranging device 20 of the first embodiment is configured to perform optical ranging. As shown in FIG. 1, the optical ranging device 20 includes an optical system 30 that projects light for ranging the object OBJ whose distance from the device is to be measured and receives the reflected light, and an SPAD operation section 100 that drives the optical system 30 and processes the signals obtained from the optical system 30. The optical system 30 includes a light emitting section 40 which emits a laser beam, a scanning section 50 which scans, with the laser beam emitted from the light emitting section 40, a predetermined region whose distance from the device is to be measured, and a light receiving section 60 which receives the reflected light from the region scanned with the laser beam.

Figure 2:
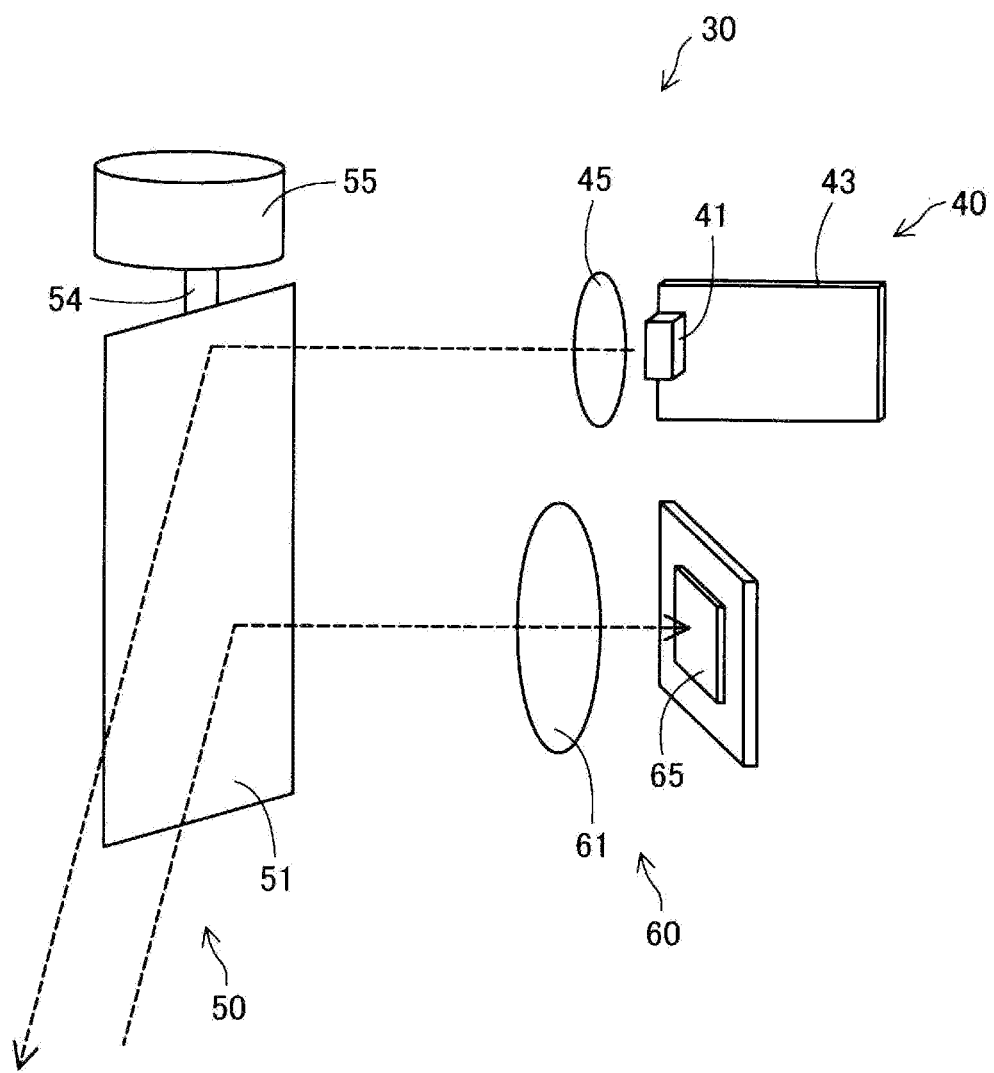
FIG. 2 is a schematic configuration diagram of an optical system.

The details of the optical system 30 are shown in FIG. 2. As shown in the drawing, the light emitting section 40 includes a semiconductor laser element (hereinafter also simply referred to as a laser element) 41 which emits a laser beam for ranging, a circuit board 43 including a drive circuit of the laser element 41, and a collimating lens 45 for converting the laser beam emitted from the laser element 41 into parallel light. The laser element 41 is a laser diode capable of producing a so-called short-pulse laser beam due to oscillation. The pulse width of the beam is about 5 nsec. The resolution of the ranging can be improved by using short pulses of 5 nsec.

The scanning section 50 includes a surface reflecting mirror 51 which reflects laser light that has been collimated by the collimating lens 45, a casing 53 which rotatably supports the surface reflecting mirror 51 by a rotating shaft 54, and a rotary solenoid 55 which drives the rotating shaft 54 to rotate. The rotary solenoid 55 externally receives a control signal Sm and repeats forward rotation and reverse rotation within a predetermined angular range (hereinafter referred to as "angle-of-view range"). As a result, the rotating shaft 54, and thus the surface reflecting mirror 51, also rotates within this range. Consequently, incident laser light from the laser element 41 via the collimating lens 45 is moved (scanned) in the lateral direction (H direction) shown in the drawing within a predetermined angle-of-view range.

The laser beam emitted by the light emitting section 40 is moved in the lateral direction (H direction) by driving the surface reflecting mirror 51 within a predetermined range. The laser element 41 has a shape that is elongated in the direction orthogonal to the H direction (hereinafter referred to as "V direction"). The structure and light emitting shape of the laser element 41 will be described later in detail.

The optical system 30 can perform ranging in a region defined by the height of the laser light in the V direction and the angular range of the scanning section 50 in the H direction. A laser light output from the optical ranging device 20 toward this region is diffusely reflected on the surface of an object OBJ such as a person or a car, and a part of the reflected light returns to the surface reflecting mirror 51 of the scanning section 50. This reflected light will be reflected by the surface reflecting mirror 51 to a light receiving lens 61 of a light receiving section 60. The light receiving lens 61 concentrates the light and sends it to a light receiving array 65.

Figure 3:
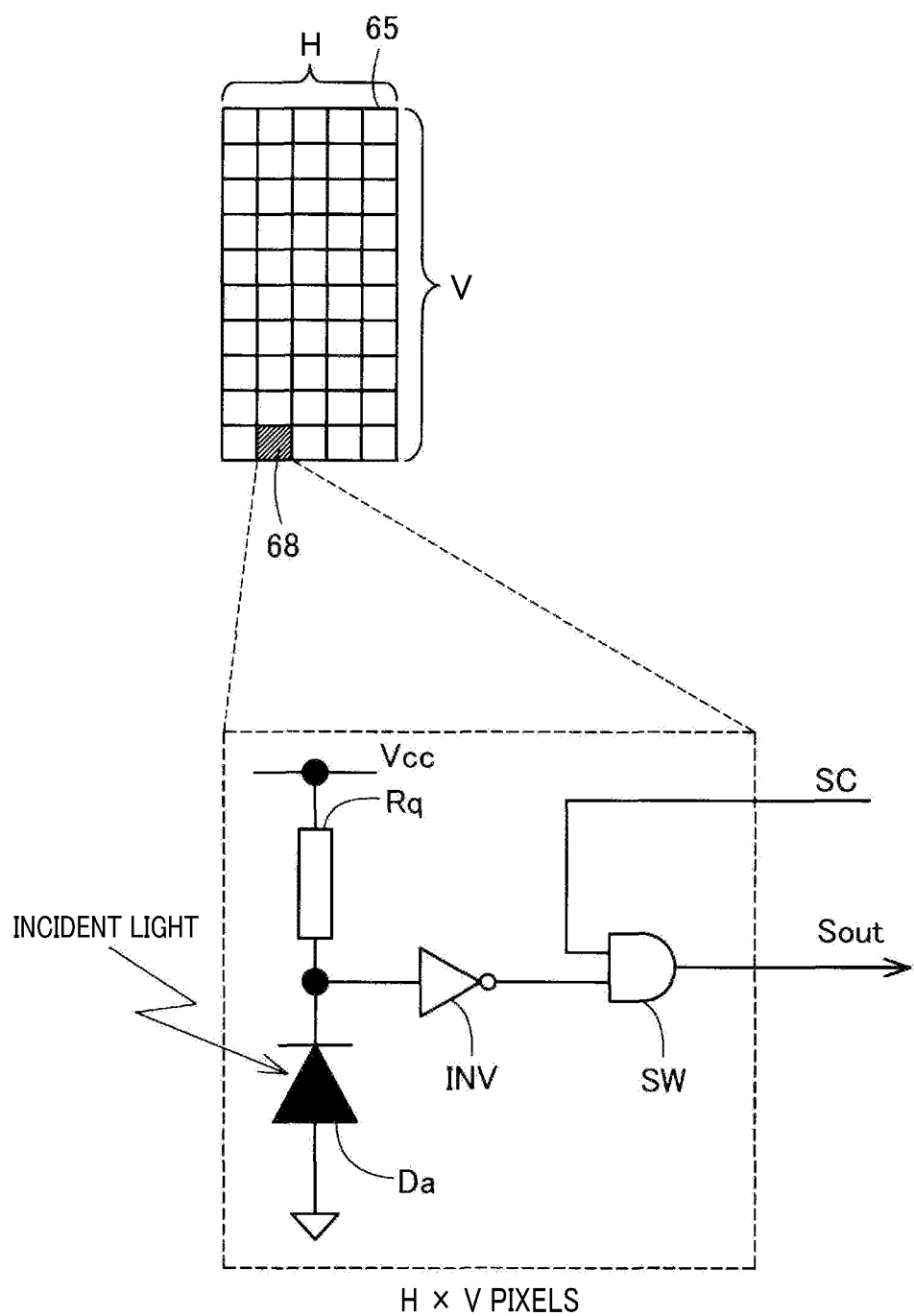
FIG. 3 is an explanatory diagram schematically showing the configuration of a light receiving array.

FIG. 3 schematically shows the configuration of the light receiving array 65. The light receiving array 65 includes a plurality of light receiving elements 68. Avalanche photodiodes (APDs) are used as the light receiving elements 68 in order to achieve high responsiveness and good detection performance. When reflected light (photons) reaches an APD, electron-hole pairs are generated. The generated electrons and holes are accelerated by a high electric field and cause impact ionization one after another, generating new electron-hole pairs (the avalanche phenomenon). Since APDs thus amplify the incident photons, APDs are often used when the intensity of reflected light may be small such as when detecting a distant object. The operating modes of an APD include a linear mode in which it is operated at a reverse bias voltage that is lower than the breakdown voltage and a Geiger mode in which it is operated at a reverse bias voltage that is equal to or higher than the breakdown voltage. In the linear mode, the number of electron-hole pairs that exit from the high-electric-field region and disappear is more than the number of generated electron-hole pairs, and the decay of the electron-hole pairs stops naturally. Therefore, the output current from an APD is substantially proportional to the amount of incident light.

On the other hand, in the Geiger mode, even a single incident photon can cause the avalanche phenomenon, and therefore the detection sensitivity can be further improved. APDs operated in the Geiger mode may be referred to as single photon avalanche diodes (SPAD).

As shown in the equivalent circuit in FIG. 3, each of the light receiving element 68 connects a quenching resistor Rq and an avalanche diode Da in series between the power supply Vcc and the ground line. The voltage at their connection point is input to an inversion element INV, which is one of the logic operation elements, to convert it into a digital signal having inverted voltage level. Since the output of the inversion element INV is connected to one of the inputs of an AND circuit SW, when the other input is at the high level H, the output of the inversion element INV is output as it is to the outside. The state of the other input of the AND circuit SW can be switched by a selection signal SC. Since the selection signal SC is used to specify the light receiving element 68 of the light receiving array 65 whose signal should be read, the selection signal SC may be referred to as an address signal. When each avalanche diode Da is to be used in the linear mode and the output is handled as an analog signal without digital conversion, an analog switch may be used instead of the AND circuit SW. It is also possible to use PIN photodiodes instead of avalanche diodes Da.

When no light is incident on the light receiving element 68, the avalanche diode Da stays in a non-conductive state. Therefore, the input side of the inversion element INV stays in a state where it is pulled up via the quenching resistor Rq, in other words, the input side is kept at the high level H. Accordingly, the output of the inverting element INV is kept at the low level L. When light is externally projected on the light receiving elements 68, the incident light (photons) causes the avalanche diodes Da to shift to a conducting state. As a result, a large current flows through the quench resistor Rq, and the input side of the inverting element INV temporarily changes to the low level L, whereas the output of the inverting element INV is inverted to the high level H. Since a large current flows through the quenching resistor Rq, the voltage applied to the avalanche diode Da decreases. Therefore, power supply to the avalanche diode Da stops and the avalanche diode Da returns to the non-conducting state. As a result, the output signal of the inverting element INV is also inverted and returns to the low level L. Consequently, when light (photons) is incident on each of the light receiving elements 68, the inverting element INV outputs a high-level pulse signal for a very short time. Hence, if the address signal SC is set to the high level H at the timing when each of the light receiving elements 68 receives light, the output signal of the AND circuit SW, that is, the output signal Sout from each of the light receiving elements 68 will be a digital signal that reflects the state of the avalanche diode Da.

Figure 4:
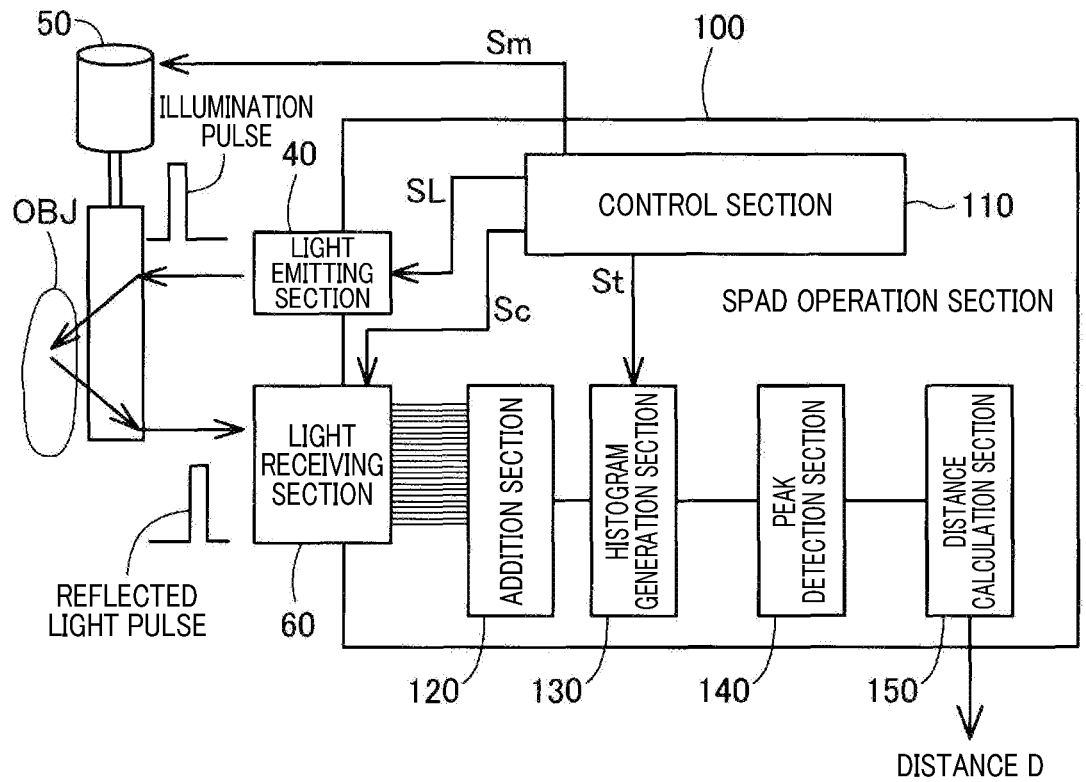
FIG. 4 is a schematic configuration diagram of an SPAD operation section.

The output Sout of each of the light receiving elements 68 is generated when the laser element 41 emits light and the light reflected by an object OBJ existing in the scanning range returns. Therefore, as shown in FIG. 4, the distance to the object can be detected by measuring the time Tf from output of laser light (hereinafter referred to as an irradiation light pulse(s)) carried out by driving the light emitting section 40 until each of the light receiving elements 68 of the light receiving section 60 detects the reflected light pulse reflected by the object OBI The object OBJ may be located at various positions, near or far from the optical ranging device 10.

As described above, each of the light receiving elements 68 outputs a pulse signal when it receives the reflected light. The pulse signal output by the light receiving element 68 is input to the SPAD operation section 100 corresponding to a ranging section. While emitting light from the laser element 41 to scan an external space, the SPAD operation section 100 calculates the distance to the object OBJ according to the time from when the laser element 41 outputs the irradiation light pulse to when the light receiving array 65 of the light receiving section 60 receives the reflected light pulse. The SPAD operation section 100 includes a well-known CPU and memory, and executes a program(s) prepared in advance to perform processing necessary for ranging. Specifically, the SPAD operation section 100 includes a control section 110 which performs overall control, an addition section 120, a histogram generation section 130, a peak detection section 140, a distance calculation section 150, and the like.

The addition section 120 is a circuit that adds the outputs of an even larger number of light receiving elements included in the light receiving elements 68 constituting the light receiving section 60. N×N (N is an integer 2 or greater) light receiving elements are further provided inside each light receiving element 68, and when a reflected light pulse reaches one of the light receiving elements 68 of the light receiving section 60, N×N elements operate. In the present embodiment, 7×7 SPADs are provided in one light receiving element 68. Needless to say, the number and arrangement of SPADs can be configured in various ways other than 7×7; for example, 5×9.

In the present embodiment, the light receiving element 68 includes a plurality of SPADs because of the characteristics of SPADs. SPADs can detect even a single incident photon, but the detection of SPADs by limited light from the object OBJ is inevitably probabilistic. The addition section 120 of the SPAD operation section 100 adds the output signals Sout from the SPADs, each of which is only capable of detecting the reflected light probabilistically, so that the reflected light can be reliably detected. Needless to say, a single SPAD may form the light receiving element 68.

The histogram generation section 130 receives the reflected light pulses thus obtained. The histogram generation section 130 adds the results of addition by the addition section 120 a plurality of times to generate a histogram. Although the signals detected by the light receiving elements 68 include noise due to ambient light and the like, when the signals from each of the light receiving elements 68 obtained by transmitting a plurality of irradiation light pulses are added up, those signals corresponding to the reflected light pulses are accumulated, whereas the signals corresponding to the noise are not accumulated. Therefore, a clear signal corresponding to the reflected light pulses can be obtained. The histogram provided by the histogram generation section 130 is analyzed, and the peak detection section 140 detects the peak of the signal. The peak of the signal is nothing but the reflected light pulse from the object OBJ which is the target of ranging. After the peak is detected, the distance calculation section 150 detects the distance D to the object by detecting the time Tf to the peak of the reflected light pulse from the irradiation light pulse. The detected distance D is output externally, for example, when the optical ranging device 20 is installed in an automated-driving vehicle, to an automated-driving device or the like. Needless to say, it can also be applied to fixed ranging devices in addition to moving objects such as drones, automobiles, and ships.

Figure 5:
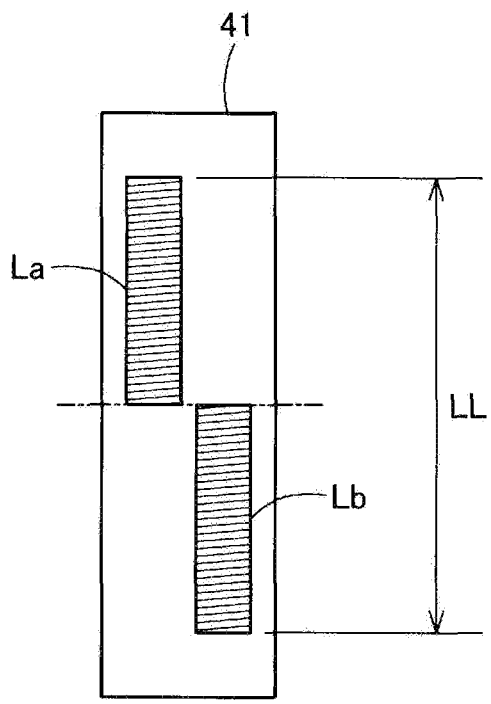
FIG. 5 is an explanatory diagram showing the arrangement of two light emitting regions of a laser element.
Figure 6:
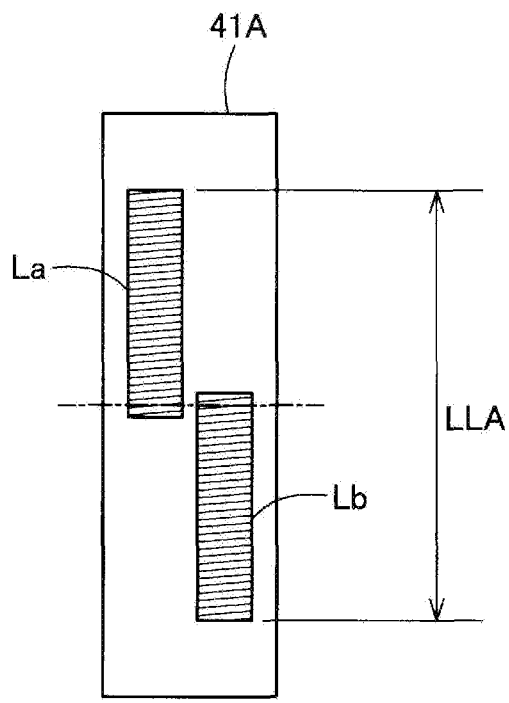
FIG. 6 is an explanatory diagram showing another arrangement of two light emitting regions of a laser element.

The control section 110 outputs a command signal SL to determine the light emission timing of the laser element 41 for the circuit board 43 of the light emitting section 40, and an address signal SC to determine which light receiving elements 68 are to be activated. In addition, the control section 110 outputs a signal St for instructing the histogram generation section 130 on the generation timing of the histogram, and a drive signal Sm for the rotary solenoid 55 of the scanning section 50. By the control section 110 outputting these signals at predetermined timings, the SPAD calculation section 100 can detect an object OBJ existing within a predetermined range, together with the distance D to the object OBI As shown in FIG. 5, the above-mentioned optical ranging device 20 includes two laser-light emitting regions La and Lb each having a shape vertically elongated in the V direction. As will be described later, these two laser-light emitting regions La and Lb are built as one semiconductor. The two laser-light emitting regions La and Lb are positioned so that they are shifted from each other in the longitudinal direction of the light emitting regions, and the lower end of the laser-light emitting region La matches with the upper end of the laser-light emitting region Lb. Hereinafter, the longitudinal direction of the laser-light emitting region is also referred to as the first direction. Therefore, although the laser-light emitting regions La and Lb are positioned so that they are shifted from each other in the direction orthogonal to the longitudinal direction (hereinafter referred to as the width direction or the second direction), the laser-light emitting regions La and Lb form a continuous light emitting region with a length of LL in the first direction. Note that, as shown in FIG. 6, the two laser emitting regions La and Lb may slightly overlap each other in the first direction, and form a laser element 41A having a length of LLA in the first direction.

Figure 7:
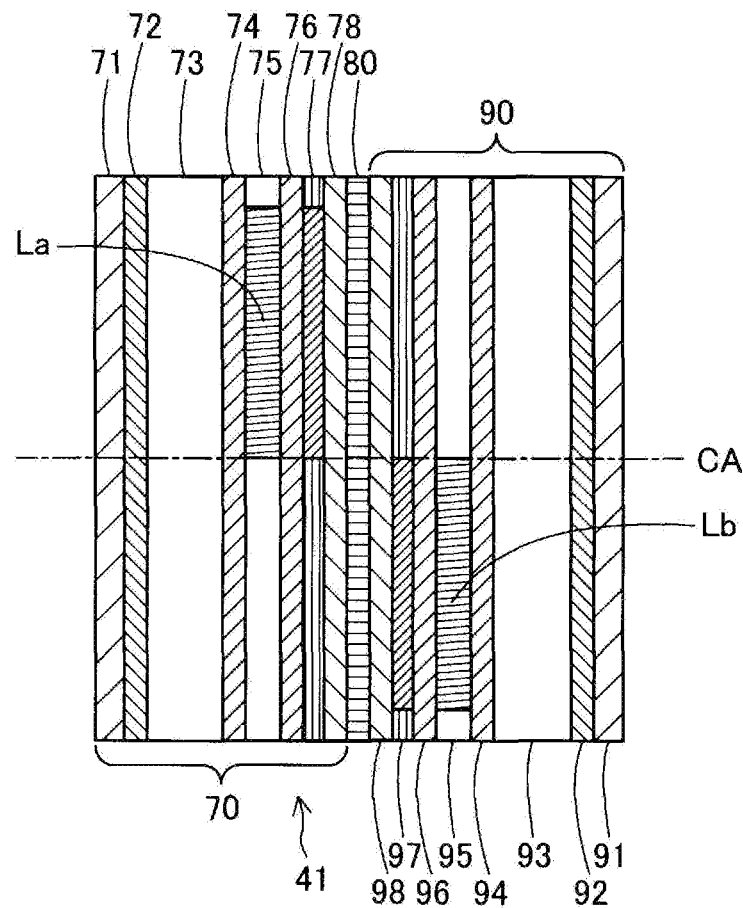
FIG. 7 is an explanatory diagram showing an example of the structure of the laser element.

As shown in FIG. 7, the laser element 41 includes a solder layer 80 at the center in the width direction, and the two laser light emitting regions La and Lb are point-symmetric with respect to the center in the direction along the layer of the solder layer 80. Consequently, the laser emitting regions La and Lb are placed so that they contact each other at the center CA in the direction along the layer of the solder layer 80. The method of manufacturing the laser element 41 will be described later.

The laser element 41 includes a laser chip 70 provided with the light emitting region La and a laser chip 90 provided with the light emitting region Lb on opposite sides of the solder layer 80 at the center. The laser chip 70 includes an N-type electrode 78, an insulating layer 77, an N-type clad layer 76, a light emitting layer 75, a P-type clad layer 73, a P-type electrode 72, and a bonding electrode 71 in this order from the solder layer 80 side. Similarly, the laser chip 90 includes a P-type electrode 98, an insulating layer 97, a P-type clad layer 96, a light emitting layer 95, an N-type clad layer 93, an N-type electrode 92, and a bonding electrode 91 in this order from the solder layer 80 side. Since the light emitting layers 75 and 95 provided with the two laser-light emitting regions La and Lb have different layered structures, i.e., N-type and P-type, it is possible to make the two laser-light emitting regions La and Lb emit light by applying a voltage across the bonding electrodes 71 and 91. Needless to say, the light emitting layer 95 provided with the light emitting region Lb may have exactly the same layered structure as the light emitting layer 75, and the same potential may be provided across the solder layer 80 and the bonding electrode 71 and across the solder layer 80 and the bonding electrode 91, so that the two laser-light emitting regions La and Lb emit light similarly.

Figure 8:
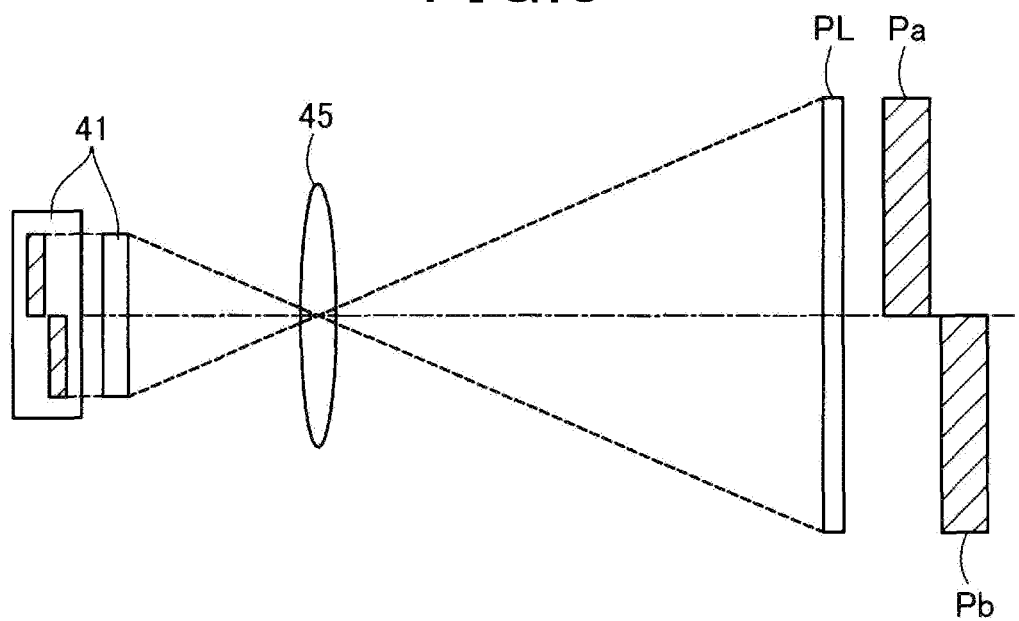
FIG. 8 is an explanatory diagram showing the optical system from the laser element side.

A ranging approach carried out using the laser element 41 will be described with reference to FIG. 8. As shown in FIG. 5, the laser element 41 includes vertically-elongated light emitting regions La and Lb. These light emitting regions La and Lb are separated in the width direction (second direction), and abut (FIG. 5) or overlap (FIG. 6) each other in the longitudinal direction (first direction). Therefore, when an illumination pulse from the laser element 41 is output to the outside via the collimating lens 45 of the light emitting section 40, as shown in FIG. 8, the height of the irradiation zone PL in the V direction of the scanned area will have a width that is at least twice or a little less than twice that of the light emitting region La even when it has a shape elongated in the first direction, not to mention when the light emitting region La is a point light source. Therefore, as in this embodiment, with only a scanning section 50 capable of performing scanning in only one direction, ranging can be performed over an area that has a large dimension not only in the H direction but also in the V direction simultaneously.

Figure 9:
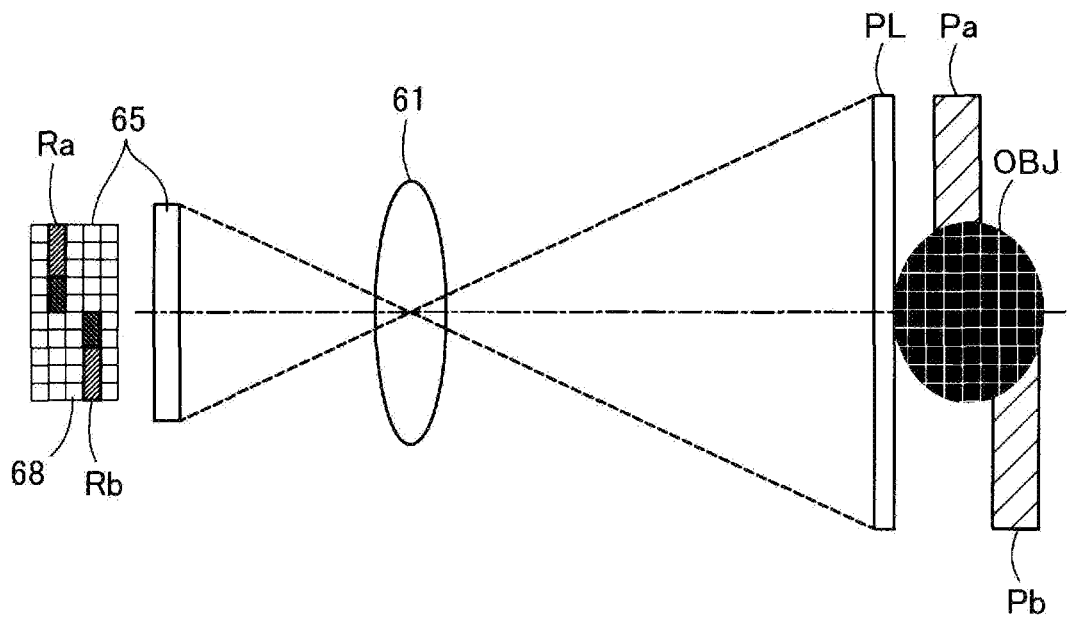
FIG. 9 is an explanatory diagram showing the optical system from the light-receiving-array side.

Needless to say, as shown in FIG. 8, since the light emitting regions La and Lb are shifted from each other in the second direction, the irradiation zone of the laser light is divided into irradiation zones Pa and Pb also in the scanned area. As shown in FIG. 9, the reflected light from the irradiation zones Pa and Pb separated in the second direction (H direction) reaches the light receiving array 65 via the light receiving lens 61 of the light receiving section 60. At this time, the reflected light from the irradiation zones Pa and Pb is imaged at the positions Ra and Rb also shifted in the second direction on the light receiving array 65. Since a plurality of light receiving elements 68 are provided in the light receiving array 65, the reflected light can be detected by these light receiving elements 68.

Figure 10:
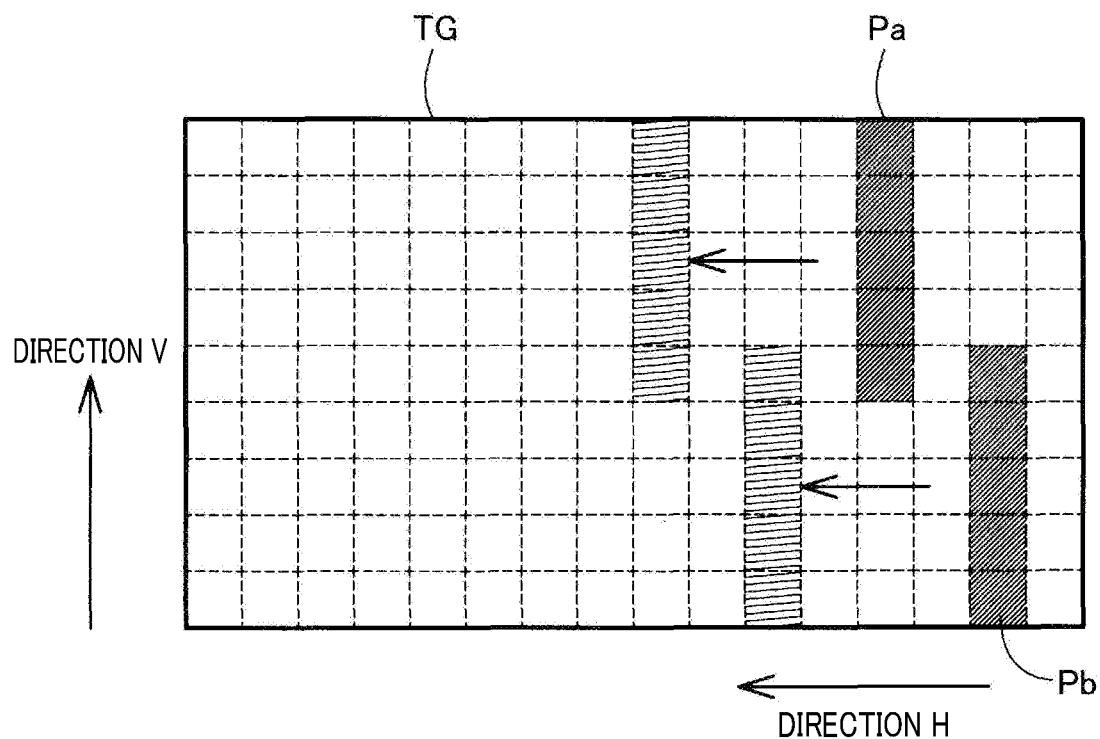
FIG. 10 is an explanatory diagram for explaining how a scanned area is scanned.

In actual ranging, the illumination pulse from the laser element 41 is moved in the H direction by the rotation of the surface reflecting mirror 51 of the scanning section 50. This is illustrated in FIG. 10. As the position (direction) of emission of the laser light moves with the rotation of the surface reflecting mirror 51, the irradiation zones Pa and Pb move in the horizontal direction (H direction) in the scanned area TG for ranging. In the example of FIG. 10, the irradiation zones Pa and Pb are shifted in the H direction (second direction) and partially overlap each other in the V direction (first direction). Since the reflected light pulses from the irradiation zones Pa and Pb are reflected by the surface reflecting mirror 51 and then enter the light receiving section 60, the positions on the light receiving array 65 of the light receiving section 60 remain the same regardless of changes in the scanning position (direction of emission) of the laser light.

Figure 11:
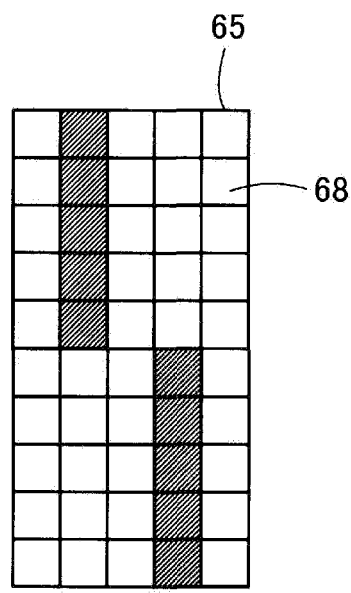
FIG. 11 is an explanatory diagram showing an example of the light receiving array.

The light receiving array 65 for detecting reflected light from the irradiation zones Pa and Pb shifted in the second direction may be an array in which a plurality of light receiving elements 68 are arranged two-dimensionally in a grid as shown in FIG. 11. By performing alignment of the optical system 30 in advance, it is possible to determine the positions on the light receiving array 65 at which the laser beams emitted from the light emitting regions La and Lb reach the array after being reflected by the object OBI Thus, the control section 110 can output an address signal SC to each of the light receiving elements 68 on which the reflected light is expected to be incident, at an appropriate timing. If there is an object OBJ in the scanned area, each of the light receiving elements 68 corresponding to the location of the object OBJ detects a reflected light pulse after a time TOF corresponding to the location of the object OBJ (the distance from the optical ranging device 20). Based on the shapes of the light emitting regions La and Lb, the light receiving elements that will not receive the reflected light may turn off the signal SC (may not be activated) in advance.

Figure 12:
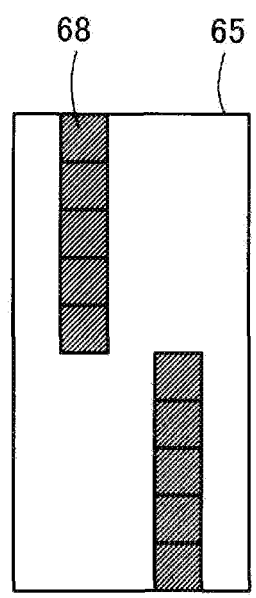
FIG. 12 is an explanatory diagram showing another example configuration of the light receiving array.
Figure 13:
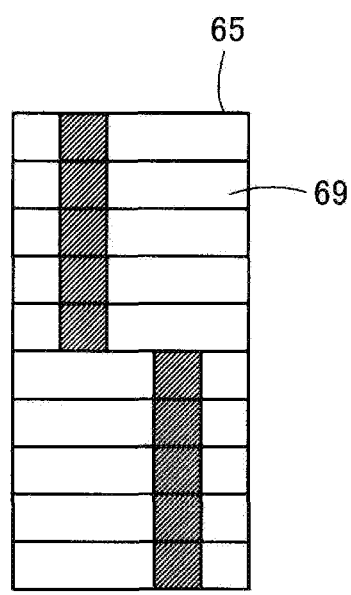
FIG. 13 is an explanatory diagram showing another configuration example of the light receiving array.

Instead of the two-dimensional arrangement of the light receiving elements 68 shown in FIG. 11, the configurations shown in FIGS. 12 and 13 may be adopted. FIG. 12 shows a configuration in which light receiving elements 68 are provided only at positions on the light receiving array 65 where the reflected light forms an image. This makes it possible to reduce the number of the light receiving elements 68 significantly as compared with the configuration of FIG. 11. Further, in FIG. 13, each light receiving element 69 has a structure elongated in the width direction, and the light receiving elements 69 are arranged in a one-dimensional arrangement. This not only significantly reduces the number of light receiving elements 69 as compared with the configuration of FIG. 11 but also facilitates alignment in the second direction.

According to the first embodiment described above, it is possible to realize a laser element 41 having a light emitting region that is staggered in the second direction but is continuous and long in the first direction. Therefore, an optical ranging device 20 provided with the laser element 41 can perform ranging over a large area corresponding to this light emitting region simultaneously. Consequently, ranging can be performed over a large two-dimensional area even when the scanning section 50 is limited to scanning in a single direction. Since the light emitting region of the laser element 41 is continuous, there will not be an unscanned region despite the fact that a plurality of light emitting elements are used.

B. Other Embodiments of Laser Elements

Figure 14:
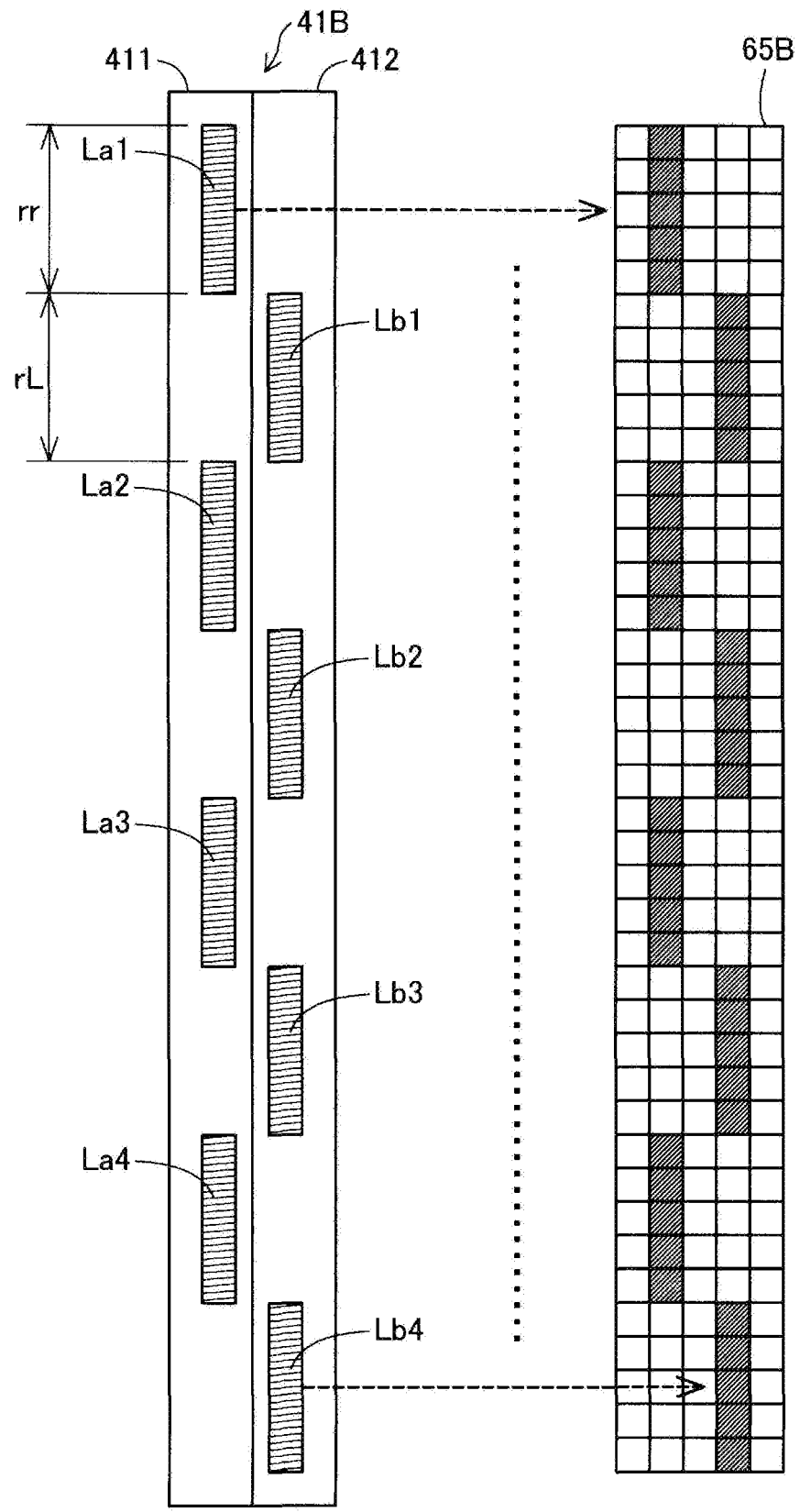
FIG. 14 is an explanatory diagram showing a mode in which a plurality of laser elements are combined.
Figure 15:
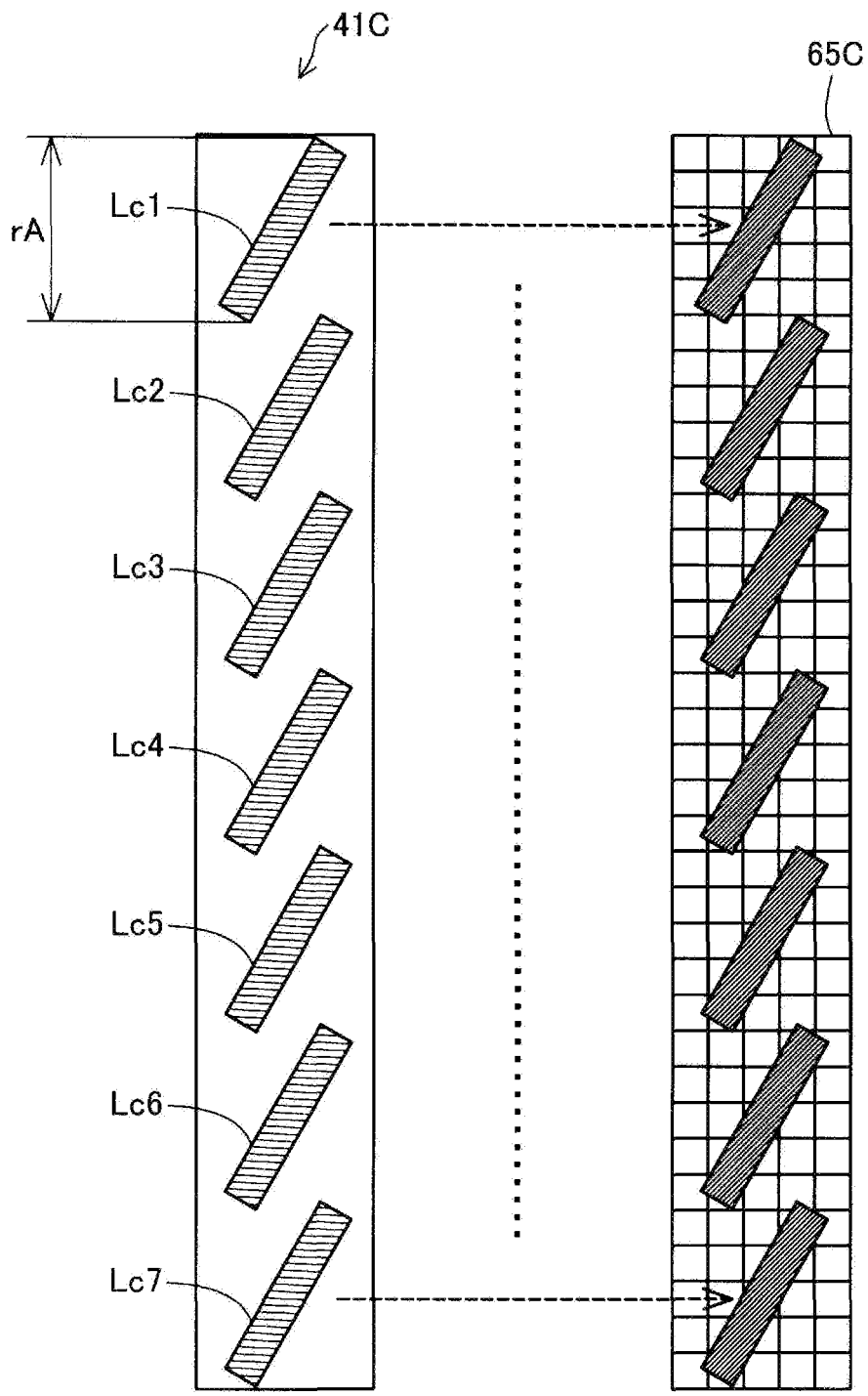
FIG. 15 is an explanatory diagram showing another mode in which a plurality of laser elements are combined.

In the first embodiment, the laser element 41 includes two light emitting regions provided in two laser chips 70 and 90, but a single laser element 41 may be provided with two or more light emitting regions. In addition or alternatively, two or more semiconductor laser elements, each having one or more light emitting regions, may be combined to form a configuration having a plurality of light emitting regions. FIGS. 14 and 15 show configuration examples including a large number of light emitting regions. In the example shown in FIG. 14, a semiconductor laser element 41B is composed of a first laser element 411 in which light emitting regions La1 to La4 are arranged at equal intervals of rL which is equal to the longitudinal dimension rr of one light emitting region, and a second laser element 412 in which a plurality of light emitting regions Lb1 to Lb4 are similarly arranged. The light emitting regions La1 to La4 of the first laser element 411 and the light emitting regions Lb1 to Lb4 of the second laser element 412 are arranged in a staggered manner, and in such a manner that the light emitting regions are continuous in the direction in which they are aligned (first direction). Note that the longitudinal dimension rr of the light emitting regions may be more than the length of the intervals rL between the light emitting regions so that the light emitting regions partially overlap each other. Further, in the configuration example of FIG. 14, the first laser element 411 and the second laser element 412 both have a plurality of light emitting regions. However, they may each have a single light emitting region, or at least one of them may have two or more light emitting regions.

In this case, the light receiving array 65B also has a corresponding dimension in the first direction, and a large number of light receiving elements are arranged two-dimensionally. Needless to say, the light receiving elements may be arranged in the same manner as the light receiving elements shown in FIG. 12 or 13. With such a configuration, it is possible to realize a laser element 41B having a light emitting region that is staggered in the second direction but is continuous and long in the first direction. An optical ranging device 20 provided with the laser element 41B can perform ranging over an area with a large dimension in the V direction corresponding to this light emitting region simultaneously. Consequently, ranging can be performed over a large two-dimensional area even when the scanning section 50 is limited to scanning in a single direction. Since the light emitting region of the laser element 41B is continuous, there will not be an unscanned region despite the fact that a plurality of light emitting elements are used. Note that, although two laser elements, namely, the first and second laser elements 411 and 412 are used in the embodiment shown in FIG. 14, three or more laser elements may be used.

As another example, as shown in FIG. 15, the light emitting regions Lc1 to Lc7 of the laser element 41C may be tilted with respect to the direction in which the light emitting regions Lc1 to Lc7 are lined up (first direction). In this way, when viewed in the direction in which the light emitting regions Lc1 to Lc7 are lined up, each light emitting region has a dimension of rA in the V direction, and the light emitting regions each having this length rA are continuous in the direction in which the light emitting regions Lc1 to Lc7 are arranged. Since the reflected light forms an image on the light receiving array 65C in accordance with this arrangement of the light emitting regions Lc1 to Lc7, this can be detected by using the light receiving elements as in the other embodiments. This modified example provides the same or similar functions and effects as those provided by the example of FIG. 14. As with the laser element 41B of FIG. 14, the light emitting regions Lc1 to Lc7 of the laser element 41C shown in FIG. 15 may be realized by separate semiconductor laser elements. Alternatively, the laser element 41C may be realized by combining a plurality of semiconductor laser elements each having a plurality of light emitting regions.

C. Method of Manufacturing Laser Element

Next, a method of manufacturing the laser element 41 used in the first embodiment will be briefly described. The laser element 41 used in the first embodiment includes two laser chips 70 and 90 with the solder layer 80 interposed between them. As shown in the upper part of FIG. 16, the laser chips 70 and 90 are formed by laminating layers by a semiconductor process, and a plurality of light emitting regions are formed at predetermined pitches in the surface direction (first direction) of the layers. The laser chips 70 and 90 are cut at desired locations, and the cut laser chips 70 and 90 are stacked and soldered. The two laser chips 70 and 90 will be bonded by the solder layer 80 after the soldering, whereby the laser element 41 can thus be obtained. Note that, when it is desired to have three or more continuous light emitting regions, the light emitting regions may be arranged so that their pitch is the same as or slightly shorter than the longitudinal dimension of the light emitting regions when laminating the layers of a laser chip, and the laser chip may be cut so that a plurality of light emitting regions are included.

With such a configuration, the light emitting region as a laser element can be made continuous in the first direction even if the light emitting regions are not continuous in one laser chip. Note that, when bonding the two laser chips with a solder layer, the laser chips 70 and 90 may be bonded inverted with respect to each other or not if the electrodes are arranged so that a voltage can be applied in the direction required for the laser chips to emit light. Similarly, the laser chips 70 and 90 may either be configured as both P-type and N-type laser chips, or laser chips of the same type. In the present embodiment, the two laser chips 70 and 90 are inverted with respect to each other and bonded with the solder layer 80. This makes it possible to reduce the distance between the two light emitting regions La and Lb in the second direction. This in turn reduces the distance between light receiving elements.

Figure 16:
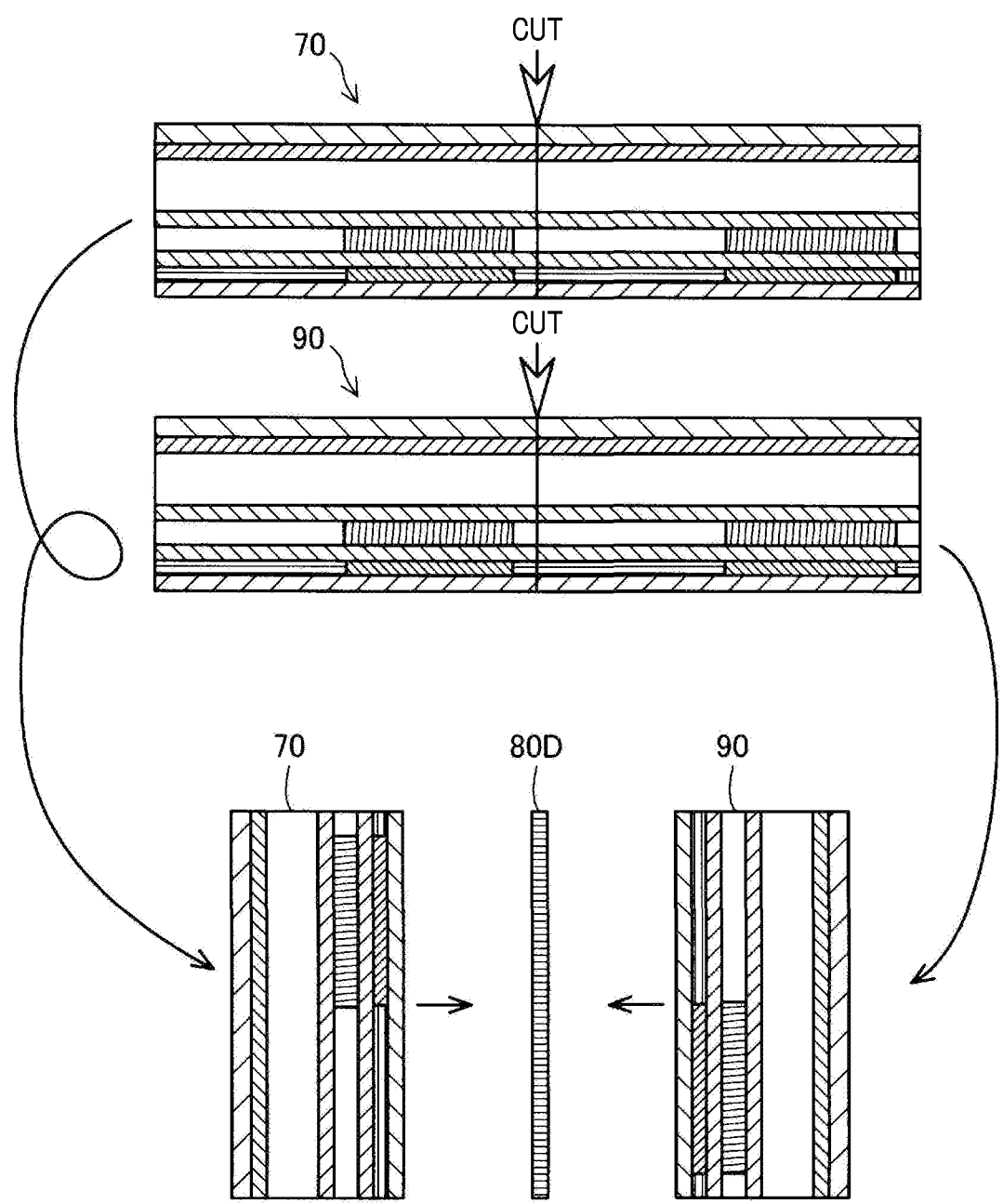
FIG. 16 is an explanatory diagram showing a process of manufacturing a laser element.

In the example of FIG. 16, one light emitting region La or Lb is formed in each of the laser chips 70 and 90. However, at least one of the laser chips may have two or more light emitting regions shifted in the layer direction of the semiconductor layers, and the laser chips may be combined. Further, in that case, three or more laser chips may be combined.

The present disclosure is not limited to the above embodiments, and can be implemented in various configurations without departing from the spirit of the present disclosure. For example, the technical features of the embodiments may be replaced or combined as appropriate to solve part or all of the above-described problems or achieve part or all of the above-described effects. When a technical feature is not described as an essential feature herein, it can be removed as appropriate.

As an aspect of the present disclosure, an optical ranging device (20) that uses laser light is provided. The optical ranging device includes: a light emitting section (40) provided with a semiconductor laser element (41) including a light emitting region having a configuration in which a length thereof in a first direction is more than that in a second direction intersecting the first direction; a light receiving section (60) that detects reflected light of the laser light emitted from the light emitting section; and a measuring section (100) that measures a distance to an object based on a time from emission of the light from the light emitting section to reception of the light by the light receiving section. The light emitting section includes a plurality of light emitting regions (La, Lb) that are separated from each other in the second direction and abut or partially overlap each other in the first direction. The light receiving section includes a plurality of light receiving elements (69) in a direction corresponding to the first direction. A width of a light receiving region in a direction corresponding to the second direction of the light receiving elements is equal to or more than a length corresponding to a gap distance of the light emitting regions in the second direction.

According to the optical ranging device, the light emitting regions are continuous in the first direction, which makes it possible to perform ranging over a large range with respect to the first direction simultaneously.

What is claimed is:

1. An optical ranging device that uses laser light, comprising:
   a light emitting section provided with a semiconductor laser element including a light emitting region having a configuration in which a length thereof in a first direction is more than that in a second direction intersecting the first direction;
   a light receiving section that detects reflected light of the laser light emitted from the light emitting section; and
   a measuring section that measures a distance to an object based on a time from emission of the light from the light emitting section to reception of the light by the light receiving section, wherein
the light emitting section includes a plurality of light emitting regions that are separated from each other in the second direction and abut or partially overlap each other in the first direction,
the light receiving section includes a plurality of light receiving elements in a direction corresponding to the first direction, and
a width of a light receiving region in a direction corresponding to the second direction of the light receiving elements is equal to or more than a length corresponding to a gap distance of the light emitting regions in the second direction.

2. The optical ranging device according to claim 1, wherein
the semiconductor laser element includes first and second semiconductor laser elements each including the light emitting region, and at least one of the first and second semiconductor laser elements includes a plurality of light emitting regions.

3. The optical ranging device according to claim 2, wherein
the first semiconductor laser element includes a plurality of light emitting regions, and the light emitting regions are spaced in the first direction at a distance shorter than the length of the light emitting region in the first direction, and
the second semiconductor laser element, which is provided separately from the first semiconductor laser element in the second direction, includes a light emitting region whose first direction is the same as the first direction of the light emitting regions of the first semiconductor laser element, and the light emitting region is positioned between the light emitting regions of the first semiconductor laser device.

4. The optical ranging device according to claim 1, further comprising:
a scanning section that causes the light from the light emitting section to move in at least one of a horizontal direction and a vertical direction to perform scanning, and
an optical system that guides the reflected light of the laser light moved in at least one of the horizontal direction and the vertical direction by the scanning section, to the light receiving section.

5. The optical ranging device according to claim 1, wherein
the light receiving section includes a plurality of light receiving elements arranged in a two-dimensional array corresponding to the first direction and the second direction.

6. The optical ranging device according to claim 5, wherein
the light receiving section is configured such that, of the light receiving elements arranged two-dimensionally, one or more light receiving elements on which the reflected light will not be incident in accordance with a shape and an arrangement of the light emitting regions are deactivated in advance.

7. A laser light emitting device configured to emit laser light, comprising:
a semiconductor laser element provided with a plurality of light emitting regions, wherein
a length of each of the light emitting regions of the semiconductor laser element in a first direction is more than a length thereof in a second direction intersecting the first direction, and
adjacent light emitting regions included in the plurality of light emitting regions are separated from each other in the second direction and abut or overlap each other in the first direction.

8. A method of manufacturing a laser light emitting device, comprising:
preparing a plurality of light emitting sections, wherein each of the light emitting sections is prepared by stacking a semiconductor layer on a substrate and forming a light emitting region, and a length of the light emitting region in a first direction, which is a layer direction of the semiconductor layer, is more than a length thereof in a second direction, which is a stacking direction of the semiconductor layer, and
arranging the light emitting sections such that the light emitting sections are separated in the second direction, and the light emitting regions of the light emitting sections abut or partially overlap each other in the first direction.

9. The method of manufacturing a laser light emitting device according to claim 8, wherein
the light emitting sections are formed by
forming a plurality of light emitting regions in the stacked semiconductor layer,
cutting apart the light emitting regions along the second direction into at least two chips each including at least one of the light emitting regions, and
bonding the cut chips together.

10. The method of manufacturing a laser light emitting device according to claim 9, wherein
at least one of the chips includes a plurality of light emitting regions, and
the light emitting regions are spaced in the first direction at a distance shorter than a length of the light emitting region in the first direction.

* * * * *